(12) United States Patent
Somekh et al.

(10) Patent No.: US 7,230,977 B1
(45) Date of Patent: Jun. 12, 2007

(54) BACK-TO-BACK MODEM REPEATER

(75) Inventors: Oren Somekh, Emek-Israel (IL); Yona Sivan, Safed (IL)

(73) Assignee: Surf Communication Solutions Ltd., Yokneam (IL)

( * ) Notice: Subject to any disclaimer, the term of this patent is extended or adjusted under 35 U.S.C. 154(b) by 0 days.

(21) Appl. No.: 10/276,894

(22) PCT Filed: May 21, 2000

(86) PCT No.: PCT/IL00/00288

§ 371 (c)(1),
(2), (4) Date: Nov. 20, 2002

(87) PCT Pub. No.: WO01/91506

PCT Pub. Date: Nov. 29, 2001

(51) Int. Cl.
*H04B 3/36* (2006.01)
*H04B 1/38* (2006.01)

(52) U.S. Cl. ............................ 375/211; 375/222

(58) Field of Classification Search ............. 375/211, 375/222; 370/43, 352, 401; 379/29, 40
See application file for complete search history.

(56) References Cited

U.S. PATENT DOCUMENTS

| | | | |
|---|---|---|---|
| 5,546,388 A | 8/1996 | Lin | |
| RE35,740 E | 3/1998 | Piasecki et al. | |
| 5,790,641 A | 8/1998 | Chan et al. | |
| 6,069,879 A * | 5/2000 | Chatter | 370/295 |
| 6,360,075 B1 * | 3/2002 | Fischer et al. | 455/3.01 |
| 6,522,688 B1 * | 2/2003 | Dowling | 375/222 |
| 6,646,998 B1 * | 11/2003 | Rasanen | 370/328 |
| 6,711,704 B1 * | 3/2004 | Tezuka | 714/712 |
| 6,842,458 B1 * | 1/2005 | Reznic | 370/463 |
| 6,973,180 B1 * | 12/2005 | Kunisch et al. | 379/399.01 |
| 2003/0123466 A1 * | 7/2003 | Somekh et al. | 370/401 |

FOREIGN PATENT DOCUMENTS

| | | |
|---|---|---|
| WO | WO 99/38351 | 7/1999 |
| WO | WO 99/38352 | 7/1999 |
| WO | WO 99/39530 | 8/1999 |
| WO | WO 99/40685 | 8/1999 |
| WO | WO 00/11843 | 3/2000 |

(Continued)

OTHER PUBLICATIONS

Surf Communication Solutions Ltd, Comparison Between Possible Procedures For Real-Time Voice Band Modem Communication Over Packet Networks (MoIP), Nov. 9-10, 2000, pp. 1-4.*

(Continued)

*Primary Examiner*—Emmanuel Bayard
*Assistant Examiner*—Lawrence B. Williams

(57) ABSTRACT

A repeater having first and second communication terminals that receives signals at either of the terminals and transmits signals responsive to the received signals at the other of the terminals, comprising: a first signal processor that receives V.90 analogue data signals from the first terminal and generates bit streams responsive thereto that accurately reproduce the data in the analogue signals; a second signal processor; and a communication channel linking the first and second signal processors wherein the second signal processor receives the bit streams generated by the first signal processor via the communication channel and transmits V.90 PCM octets responsive thereto via the second terminal.

31 Claims, 8 Drawing Sheets

FOREIGN PATENT DOCUMENTS

| | | |
|---|---|---|
| WO | WO 01/01654 | 1/2001 |
| WO | WO 01/35228 | 5/2001 |
| WO | WO 01/60008 | 8/2001 |
| WO | WO 01/91441 | 11/2001 |
| WO | WO 01/97503 | 12/2001 |

OTHER PUBLICATIONS

ITU-T Telecommunication Standardization Sector of ITU; "Series V: Data Communication Over the Telephone Network—General;""Procedures for Starting Sessions of Data Transmission Over the Public Switched Telephone Network;" Feb. 1998; International Telecommunication Union (ITU) V.8.

ITU-T Telecommunication Standardization Sector of ITU; "Data Communication Over the Telephone Network;" "1200 Bits per Second Duplex Modem Standardized for Use in the General Switched Telephone Network and on Point-to-Point 2-Wire Leased Telephone-Type Circuits;" 1993; International Telecommunication Union; ITU-T Recommendation V.22.

ITU-T Telecommunication Standardization Sector of ITU; "Data Communication Over the Telephone Network;" "A Family of 2-Wire, Duplex Modems Operating at Data Signalling Rates of up to 9600 bit/s for Use on the General Switched Telephone Network and on Leased Telephone-Type Circuits;" Mar. 1993; International Telecommunication Union; ITU-T Recommendation V.32.

ITU-T Telecommunication Standardization Sector of ITU; "Series V: Data Communication Over the Telephone Network—Interfaces and Voiceband Modems;" "A Modem Operating at Data Signalling Rates of up to 33 600 Bits/s for Use on the General Switched Telephone Network and on Leased Point-to-Point 2-Wire Telephone-Type Circuits;" Oct. 9, 1996; International Telecommunication Union; ITU-T Recommendation V.34, XP002082229.

ITU-T Telecommunication Standardization Sector of ITU; "Series T: Terminals for Telematic Services;" "Procedures of real-time Group 3 facsimile communication over IP networks;" Jun. 18, 1998; International Telecommunication Union; ITU-T Recommendation T.38, XP002163782.

ITU-T Telecommunication Standardization Sector of ITU; "Series V: Data Communication Over the Telephone Network—Simultaneous Transmission of Data and Other Signals" "A Digital Modem and Analogue Modem Pair for Use on the Public Switched Telephone Network (PSTN) at Data Signalling Rates of up to 56,000 Bits/s Downstream and up to 33,600 Bits/s Upstream;" Sep. 1998; International Telecommunication Union (ITU) V.90.

ITU-T Telecommunication Standardization Sector of ITU; "Series V: Data Communication Over the Telephone Network—Simulateous Transmission of Data and Other Signals;" "Enhancements to Recommendation V.90;" Nov. 2000; International Telecommunication Union (ITU) V.92.

Gieseler, S.; Tunnelbau. Remote-Access-Server als Basis für Virtual Private Networks; Net—Zeitschrift Fuer Kommunikationsmanagement, Huthig Verlag; vol. 52; No. 8/9; 1998; pp. 38-40; XP000782761.

Yu, S. et al.; "A Multimedia Gateway for phone/fax and MIME Mail;" Aug. 25, 1997; Computer Communications; vol. 20; No. 8; pp. 615-627; XP004126715.

* cited by examiner

BACK-TO-BACK MODEM REPEATER

RELATED APPLICATIONS

The present application is a U.S. national filing of PCT Application No. PCT/IL00/00288, filed on May 21, 2000.

FIELD OF THE INVENTION

The invention relates to providing telecommunications services to customers of a public switched telephone network (PSTN) and in particular to providing high speed data communication services to customers via pair-gain systems.

BACKGROUND OF THE INVENTION

Pair-gain systems are widely used to expand customer capacity of an existing infrastructure of a PSTN. By using a pair-gain system, a single two-wire channel between a PSTN central office and a neighborhood, which would normally be used to provide telephone service to a single customer in the neighborhood, is usable to provide telephone service to a plurality of customers in the neighborhood.

A pair-gain system generally comprises a central office terminal at or near to a central office of the PSTN and a "remote terminal" in a neighborhood of geographically localized customers serviced by the PSTN. A single two-wire channel connects the central office terminal and the remote terminal.

The central office terminal comprises an analogue front end for each of the customers, a multiplexer and a high-speed modem. The analogue front end for each customer receives analogue signals intended for the customer from a line card in the central office that services the customer. It converts the analogue signals that it receives to digital signals using an A-law or μ-law companding algorithm with 8 bit resolution and a sampling frequency of 8000 samples per second. The digitized signals are transmitted in a DS0 data steam (8000 samples per second at 8 bit resolution) to the multiplexer. The multiplexer multiplexes DS0 data streams from all of the analogue front ends and transmits the multiplexed data streams via a high-speed modem to the remote terminal. The remote terminal, which comprises a line card for each customer, a multiplexer and a high-speed modem, demultiplexes the data streams and routes them to their intended customers. The pair-gain system operates in a similar manner in transmitting voice and data signals upstream, from the customers to the central office.

The pair-gain system provides each customer in the neighborhood with a communication channel that supports voice signal transmission and data signal transmission at rates up to a maximum of 33.6 KBps, which is the maximum transmission rate provided by V.34 voice band modems. This maximum data signal transmission rate supports maximum data transmission rates provided by all V series voice band modems with the exception of maximum transmission rates provided by PCM modems, such as V.90 and V.92 modems, which are higher than the maximum transmission rates of the other V series modems.

ITU-T Recommendation V.90 (09/98) defines specifications for a V.90 digital modem and V.90 analogue modem pair for use on the Public Switched Telephone Network. The recommendation, hereinafter referred to as a V.90 protocol, provides for data signaling rates of up to 56 KBps downstream from the digital modem to the analogue modem and up to 33.6 KBps upstream from the analogue modem to the digital modem. The V.90 analogue modems, hereinafter referred to as "V.90A modems", are designed according to the protocol to receive analogue data signals from the PSTN at rates up to 56 KBps and transmit data at rates up to 33.6 KBps. The digital V.90 modems, hereinafter referred to as "V.90D modems", are designed to transmit PCM data at 56 KBps. The design of the V.90 modem pair enables a customer connected to an internet service provider (ISP) that transmits data downstream using a V.90D modem to receive data from the ISP at up to 56 KBps. Upstream data from the user to the ISP, which normally consists of low bandwidth data such as keystrokes and short messages, is comfortably accommodated by the maximum V.90A upstream rate of up to 33.6 KBps.

However, for a V.90A modem to receive V.90 data from a sender, signals that the sender transmits should not undergo an analogue to digital conversion, known as a tandem link, en route to the modem that adds quantization noise to the signals. The analogue to digital conversions that analogue front ends, hereinafter referred to as "conventional front ends", in conventional pair-gain systems perform on signals that they receive introduce substantial quantization noise into the signals. As a result, a customer with a V.90A modem connected to his or her local central office via a conventional pair-gain system is not able to receive data at the maximum data receive rate that the V.90A modem provides. The customer's V.90A modem will perform a fall back to a V.34 modem protocol (as described in ITU-T V.90 9/98) and limit data receive rates up to a maximum receive rate of 36.6 KBps.

SUMMARY OF THE INVENTION

An aspect of some embodiments of the present invention relates to providing a pair-gain system that supports "V.90" data transmission at up to 56 KBps from a V.90D modem to a V.90A modem connected to the V.90D modem via the pair-gain system.

A pair-gain system in accordance with an embodiment of the present invention performs a high fidelity analogue to digital conversion of signals that it receives at its central office terminal from a central office to which it is connected. As a result, V.90 data signals transmitted by the pair-gain system from a central office to a V.90A modem of a customer connected to the central office via the pair-gain system can be accurately decoded by the customer's V.90A modem.

In accordance with an embodiment of the present invention a pair-gain system comprises a central office terminal and a remote terminal in which conventional analogue front ends and line cards are respectively replaced with high fidelity analogue front ends and high fidelity line cards.

The high fidelity analogue front ends have a resolution of 15 bits or higher and sample signals that they digitize at sampling rates equal to or greater than 8000 samples per second. Multiplexers and high-speed modems in the central office terminal and remote terminal are matched to receive digital data at data rates generated by the high fidelity analogue front ends. The pair gain system operates similarly to the way in which conventional pair-gain systems operate. However, as a result of the relatively high resolution with which the high fidelity front ends convert analogue signals to digital signals, the pair-gain system supports transmission of V.90 data at rates up to 56 KBps.

In accordance with another embodiment of the present invention, the pair-gain system has a central office terminal comprising a repeater in place of an analogue front end for each customer connected to the central office via the pair-gain system that is to be serviced with V.90 data.

The repeater comprises a controller, a V.90A modem and a V.90D modem and receives analogue signals from the central office intended for the customer. The controller operates to determine if a call routed to or from the customer by the central office is a voice call, a data transmission call according to a protocol other than a V.90 protocol or a data transmission call according to the V.90 protocol, hereinafter a "V.90 call". For convenience, all calls other than a V.90 call are hereinafter referred to as "voice calls".

In some embodiments of the present invention, if the controller determines that a call to or from the customer is a voice call, the repeater performs similarly to a conventional analogue front end. The repeater converts analogue data signals that it receives from the central office using a companding algorithm with 8 bit resolution and a sampling rate of 8000 samples per second to generate a DS0 data stream. The DS0 data stream is transmitted to a multiplexer comprised in the central office and therefrom to the pair-gain system's remote terminal via a high-speed modem.

If however, the controller determines that the call is a V.90 call, the V.90A modem demodulates signals from the central office intended for the customer into a bit stream that it transmits to the V.90D modem. The V.90D modem parses the bits that it receives into PCM octets according to the V.90 protocol and transmits the octets in a DS0 data stream to the multiplexer.

The conversion of the "V.90" signals by the V.90A modem into bit streams is preferably a linear conversion, i.e. without companding, performed with resolution equal to or greater than 15 bits and at a sampling rate greater than or equal to 8000 samples per second. In some embodiments of the present invention the sampling rate is greater than or equal to 9,600 samples per second. In some embodiments of the present invention the sampling rate is greater than or equal to 16,000 samples per second. For sampling rates greater than 8,000 samples per second hardware feedback is generally not required to synchronize sampling times with transmission times of signals received from the central office.

As a result of the linearity, enhanced resolution and sampling rate (and/or sampling synchronization) of the analogue to digital conversion performed by the V.90A modem, the bit stream that it generates responsive to the analogue signals it receives is a high fidelity bit stream that accurately represents data contained in the analogue signals. Therefore, the DS0 data stream generated by the V.90D modem has substantially less quantization noise than a DS0 data stream generated by a conventional analogue front end. The data stream can be transmitted at transmission rates up to 56 KBps and accurately decoded by a V.90A modem.

Hereinafter, a repeater operating, in accordance with an embodiment of the present invention, to generate a DS0 data stream similar to DS0 data streams generated by a conventional analogue front end is said to be in a "voice call mode". A repeater operating, in accordance with an embodiment of the present invention, to transmit V.90 data according to the V.90 protocol is said to be in a "V.90 call mode".

In some embodiments of the present invention ECDC layers are terminated at the repeater modems. However, according to an aspect of some embodiments of the present invention, when the repeater is in V.90 call mode, the controller operates so that data transmission rates upstream and downstream from the V.90A modem are respectively equal to upstream and downstream transmission rates from the V.90D modem. As a result, for these embodiments, ECDC layers in a V.90 call do not have to be terminated at the repeater modems. Preferably, ECDC layers are terminated at the customer's V.90A modem and at a V.90D modem connected via the central office in the V.90 call to the customer V.90A modem. By obviating ECDC termination at the repeater modems, the repeater is transparent in a communication session with the customer and delays that might otherwise be introduced into data transmission to or from the customer can be substantially reduced.

According to an aspect of some embodiments of the present invention, upstream and downstream data transfer between the repeater modems is buffered respectively by upstream and downstream buffers. In some embodiments of the present invention, the upstream and downstream buffers are cyclic buffers.

It should be noted that the pair-gain system comprising repeaters, in accordance with an embodiment of the present invention, can be identical to a conventional pair-gain system except for the replacement of analogue front ends in the central office terminal of the conventional pair-gain system with the repeaters. It is therefore relatively easy and inexpensive to upgrade a prior art pair-gain system to a pair-gain system in accordance with an embodiment of the present invention that supports V.90 data transmission. No modifications of the prior art pair-gain system are required at the pair-gain system's remote terminal. In some embodiments of the present invention the only modification required is replacing the analogue front ends at the prior art pair-gain system's central office with repeaters.

There is therefore provided, in accordance with an embodiment of the present invention, a repeater having a first and second communication terminals that receives signals at either of the terminals and transmits signals responsive to the received signals at the other of the terminals, comprising:

a first signal processor that receives V.90 analogue data signals from the first terminal and generates bit streams responsive thereto that accurately reproduce the data in the analogue signals;

a second signal processor;

and a communication channel linking the first and second signal processors wherein the second signal processor receives the bit streams generated by the first signal processor via the communication channel and transmits V.90 PCM octets responsive thereto via the second terminal.

Preferably the repeater comprises a controller that monitors signal traffic at the repeater terminals and controls the processors responsive to the signal traffic. Preferably, the second signal processor receives V.90 PCM octets from the second terminal and generates bit streams responsive thereto that are transmitted to the first modem via the communication channel. The first signal processor preferably transmits analogue signals responsive to the bit streams that it receives from the second signal processor via the first terminal.

Preferably, the first signal processor is a first modem. Preferably, the second signal processor is a second modem.

Preferably, when the first and second terminals are connected to third and fourth modems respectively so as to transmit data between the third and fourth modems, the repeater first and second modems negotiate data transfer rates respectively with the third and fourth modems respectively and the controller controls the repeater modems so as to establish a negotiated upstream data rate from the repeater first modem to the third modem that is equal to a negotiated upstream data rate from the fourth modem to the repeater second modem.

Preferably, the controller controls the repeater modems so as to establish a negotiated downstream data rate from the connected third modem to the repeater first modem that is equal to a negotiated downstream data transfer rate from the repeater second modem to the fourth modem.

Preferably, the repeater comprises an alternate communication link over which signals can be transmitted between the first and second terminals without being routed through the repeater modems. Preferably, if the controller cannot establish equal upstream and downstream data rates within a predetermined period of time, the controller routes signals between the first and second terminals via the alternate communication link.

In some embodiments of the present invention, if the controller determines from the data traffic that the repeater is connected to transmit signals other than V.90 data signals, the controller routes signals between the first and second terminals via the alternate communication link.

In some embodiments of the present invention, the alternate communication link comprises an analogue front end that receives analogue signals from the first terminal and generates a bit stream responsive thereto and wherein digital signals responsive to the bit stream are transmitted from the second terminal.

Preferably, the alternate communication link comprises resampling circuitry that resamples analogue front end bit streams to provide a resampled bit stream that is transmitted from the second terminal. Preferably, the resampling circuitry resamples digital signals received at the second terminal into analogue front end bit streams that are transmitted to the analogue front end which generates analogue signals responsive thereto, which are transmitted from the first terminal.

In some embodiments of the present invention, the analogue front end bit streams are characterized by a bit rate greater than that of a DS0 data stream. Preferably, the resampling circuitry resamples analogue front end bit streams into DS0 data streams and DS0 data streams received from the second terminal into analogue front end bit streams.

In some embodiments of the present invention, the analogue front end is comprised in the first repeater modem.

In some embodiments of the present invention, the first modem is a V.90 analogue modem. Preferably, the second modem is a V.90 digital modem.

Preferably, when the third modem is a V.90 digital modem connected to the first terminal via a line card and the fourth modem is a V.90 analogue modem connected to the second terminal via a line card, in order to establish equal downstream rates, during the negotiations the controller controls the repeater digital modem to pause negotiation of a downstream rate until a possible downstream rate is determined from the connected digital modem to the repeater analogue modem.

Preferably, if a maximum negotiable downstream rate from the repeater digital modem to the connected analogue modem is less than or equal to the possible downstream rate for the connected digital modem to the repeater analogue modem, the controller waits until the connected analogue modem determines a downstream rate from the repeater digital modem and controls the repeater analogue modem to determine a downstream rate from the connected digital modem equal to the downstream rate determined by the connected analogue modem.

Preferably, if the maximum negotiable downstream is greater than the possible downstream rate from the connected digital modem to the repeater analogue modem, the controller controls the repeater digital modem to set a maximum negotiable downstream rate equal to the possible downstream rate and begin negotiation of the downstream rates between the repeater modems and the connected modems again.

Preferably, in order to establish equal upstream rates, the controller determines a maximum possible upstream rate from the connected analogue modem to the repeater digital modem and receives, from the connected digital modem, a maximum upstream rate from the repeater analogue modem to the connected digital modem and wherein the controller controls the repeater digital modem to set a maximum upstream rate from the connected analogue modem to the repeater digital modem equal to the smallest of the determined maximum possible upstream rate and the maximum upstream rate received from the connected digital modem.

Preferably, following setting of the maximum upstream rate from the connected analogue modem to the repeater digital modem the controller controls of the repeater analogue modem so as to set a maximum transmission rate by the repeater analogue modem equal to the upstream rate set for data transmission from the connected analogue modem to the repeater digital modem.

In some embodiments of the present invention, an ECDC layer is not terminated at the repeater modems.

In some embodiments of the present invention an ECDC layer is terminated at the repeater modems.

In some embodiments of the present invention, the communication channel comprises a first buffer and wherein the second signal processor writes the bit streams that it generates on the buffer. Preferably, the first signal processor reads the bit stream from the first buffer. Additionally or alternatively, the second buffer is a cyclic buffer.

In some embodiments of the present invention, the communication channel comprises a second buffer and wherein the first signal processor writes the bit streams that it generates on the second buffer. Preferably, the second signal processor reads the bit streams from the second buffer. Additionally or alternatively, the buffer is a cyclic buffer.

There is further provided, in accordance with an embodiment of the present invention, a pair gain system comprising a central office terminal that receives analogue signals from a central office of a PSTN for a plurality of customers of the PSTN, multiplexes the signals and transmits them to a remote terminal where the signals are demultiplexed and transmitted to the customers for whom they were intended, wherein the central office terminal comprises:

a repeater in accordance with an embodiment of the present invention for each customer that receives analogue signals from the central office for the customer at the first terminal and generates a digital data stream responsive thereto that it transmits from the second terminal;

a multiplexer that receives data streams generated by each of the repeaters and multiplexes the received signals; and a modem that receives the multiplexed signals and transmits them to the remote terminal.

Preferably, the remote terminal comprises: a modem that receives multiplexed signals from the central office terminal modem; a multiplexer that receives the multiplexed signals from the remote terminal modem; and a line card for each of the plurality of customers, wherein the multiplexer demultiplexes the signals received from the remote terminal modem and routes the demultiplexed signals to the respective line cards of the customers for whom the demultiplexed signals are intended and wherein the line cards code and encode data according to a µ-law or an A-law companding algorithm at a sampling rate of 8000 samples per second and a resolution of 8 bits.

There is further provided, in accordance with an embodiment of the present invention, a pair gain system comprising a central office terminal that receives analogue signals from a central office of a PSTN for a plurality of customers of the PSTN, multiplexes the signals and transmits them to a remote terminal where the signals are demultiplexed and transmitted to the customers for whom they were intended, wherein the central office terminal comprises:

an analogue front end for each customer that receives voice and data analogue signals from the central office for the customer and digitizes the signals;

a multiplexer that receives digital data streams responsive to the digitized signals generated by each of the analogue front ends and multiplexes the received signals; and a modem that receives the multiplexed signals and transmits them to the remote terminal, wherein the analogue front are linear analogue front ends that digitize signals at a sampling rate of at least 8000 samples a second with a resolution of at least 15 bits.

Preferably, the remote terminal comprises: a modem that receives multiplexed signals from the central office terminal modem; a multiplexer that receives the multiplexed signals from the remote terminal modem; and a line card for each of the plurality of customers wherein the multiplexer demultiplexes the signals received from the remote terminal modem and routes the demultiplexed signals to the respective line cards of the customers for whom the demultiplexed signals are intended and wherein the line cards are linear line cards that operate at a sampling rate and resolution equal respectively to the sampling rate and resolution of the central office terminal front ends.

There is further provided, in accordance with an embodiment of the present invention, a method for upgrading a conventional pair gain system so that it enables transmission of V90 data between a V90 analogue and V90 digital modem via the pair gain system wherein the conventional pair gain system comprises a central office terminal that receives analogue signals from a central office of a PSTN for a plurality of customers of the PSTN, multiplexes the signals and transmits them to a remote terminal where the signals are demultiplexed and transmitted to the customers for whom they were intended, wherein the central office terminal comprises:

an analogue front end for each customer that receives voice and data analogue signals from the central office for the customer and digitizes the signals;

a multiplexer that receives digital data streams responsive to the digitized signals generated by each of the analogue front ends and multiplexes the received signals; and a modem that receives the multiplexed signals and transmits them to the remote terminal, and wherein upgrading the pair gain system comprises replacing each analogue front end with a repeater according to an embodiment of the present invention.

Preferably, the remote terminal comprises: a modem that receives multiplexed signals from the central office terminal modem; a multiplexer that receives the multiplexed signals from the remote terminal modem; and a line card for each of the plurality of customers. Alternatively or additionally, the analogue front ends digitize signals that they receive using a companding algorithm with 8 bit resolution and a sampling frequency of 8000 samples per second.

There is further provided, in accordance with an embodiment of the present invention, a method for transmitting data between a first V.90 digital modem and a first V.90 analogue modem, the method comprising: receiving V90 analogue signals generated responsive to PCM octets transmitted by the first V.90 digital modem; converting the analogue signals to a digital bit stream that preserves the data in the PCM octets; parsing the bit stream to V.90 PCM octets; and transmitting the octets to the first analogue modem.

Preferably, the method comprises transmitting data to the first analogue modem at a data rate equal to the rate at which data is received from the digital modem. Additionally or alternatively, the method comprises: receiving V.90 PCM octets generated responsive to analogue signals transmitted by the V.90 analogue modem; converting the octets to a digital bit stream that preserves the data in the octets; generating analogue signals responsive to the bit stream; and transmitting the analogue signals to the digital modem. Preferably, the method comprises transmitting data to the digital modem at a data rate equal to the rate at which data is received from the analogue modem.

BRIEF DESCRIPTION OF FIGURES

The invention will be more clearly understood from the following description of embodiments thereof, read with reference to the figures attached hereto. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DETAILED DESCRIPTION OF EMBODIMENTS

Figure 1:
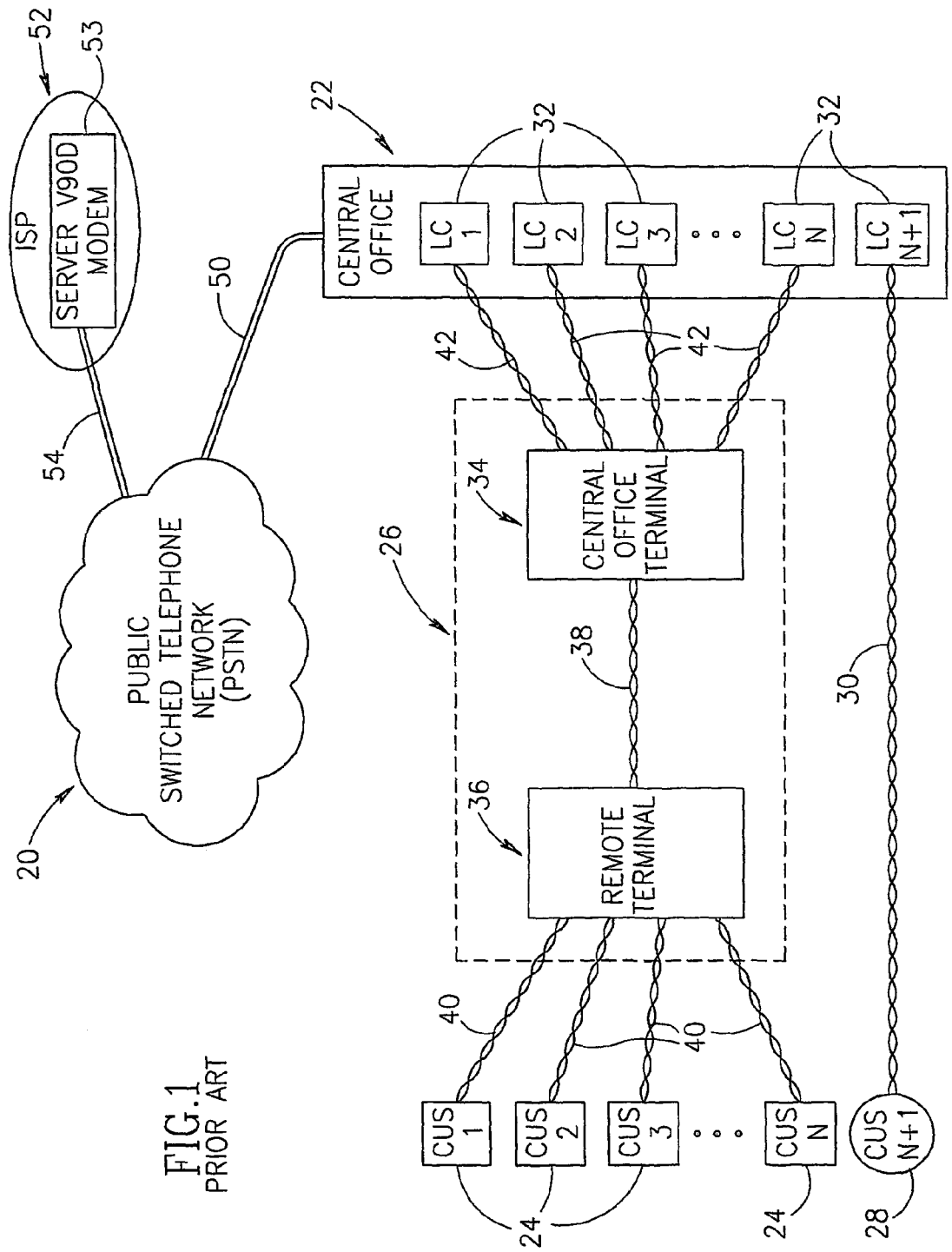
FIG. 1 schematically shows a prior art pair-gain system connecting a plurality of customers to a central office of the PSTN.

FIG. 1 schematically shows a PSTN 20 and a central office 22 that connects customers to the PSTN. Central office 22 is shown connected to a plurality of customers 24 generally located in a same geographically localized neighborhood via a prior art pair-gain system 26. Central office 22 is, by way of example, also connected to an additional customer 28 via a twisted pair 30 that extends from central office 22 to customer 28. Central office 22 generally comprises a different line card 32 for each of the customers that it services.

Pair-gain system 26 comprises a central office terminal 34 in or nearby central office 22 and a remote terminal 36 located in the neighborhood of customers 24. Central office terminal 34 is generally connected to remote terminal 36 via a single twisted pair 38. Each customer 24 is usually connected to remote terminal 36 via a twisted pair 40. Each line card 32 that services a customer 24 is generally connected to central office terminal 34 via a relatively short twisted pair 42. In the absence of pair-gain system 26, the twisted pair 42 from each line card would have to extend all the way to the particular customer 24 serviced by the line card, in the same way that twisted pair 30 extends all the way to customer 28.

PSTN 20 operates digitally and transmits and receives data and voice signals in digital form to and from central office 22 via a digital trunk 50. When a call is placed to a customer 24 or customer 28, central office 22 receives digital data or voice signals from PSTN 20 addressed with a telephone number of the customer which it routes to the customer's line card 32. The customer's line card converts the digital signals that it receives to appropriate analogue signals and transmits the analogue signals "downstream" to the customer via the twisted pair to which the line card is connected.

Analogue signals transmitted by the line card 32 that services customer 28 are transmitted directly to customer 28 via twisted pair 30. Analogue signals transmitted by line cards 32 that service customers 24 are received by central office terminal 34 of pair-gain system 26. Central office terminal 34 digitizes and multiplexes the analogue signals and transmits the multiplexed signals via a high-speed modem (not shown) over twisted pair 38 to remote terminal 36. The high speed modem generally introduces substantially only a delay in signal transmission from central office terminal 34 to remote terminal 36 and substantially does not contribute to bit error rate of the multiplexed signals. Remote terminal 36 demultiplexes the signals it receives and routes them to customers 24 via twisted pairs 40. Pair-gain system 26 operates similarly in the reverse direction in transmitting data or voice signals upstream from customers 24 to central office terminal 22.

Whereas most customers of PSTN 20 are connected to a central office of the PSTN via an analogue channel, either directly or via a pair-gain system, some customers of the PSTN are connected to their respective central offices via a digital trunk. Most ISPs and some businesses are connected to the PSTN via digital trunks.

FIG. 1 shows an ISP 52 having a V.90D modem 53 connected to PSTN 20 via a digital trunk 54. Data signal transmission between ISP 52 and PSTN 20 is generally completely digital and data signals transmitted between ISP 52 and a central office of the PSTN do not undergo analogue to digital conversion.

If ISP 52 transmits digital data signals to customer 28, the signals are transmitted to central office 22 where the line card 32 that services customer 28 converts the digital signals to analogue signals and transmits the analogue signals to customer 28 via twisted pair 30. En route from ISP 52 to customer 28 there is no analogue to digital conversion. If customer 28 is connected to twisted pair 30 via a V.90A modem, the customer can receive data from ISP 52 at a maximum transmission rate substantially equal to the maximum data receive rate of 56 KBps that the V.90A modem supports.

On the other hand, data signals from ISP 52 to a customer 24 connected to central office 22 via pair-gain system 26 undergo analogue to digital conversion at central office terminal 34. The conversion introduces quantization noise to the signals to such a degree that the signals cannot be accurately decoded by a V.90A modem. As a result, if the customer 24 is connected to pair-gain system 26 via a V.90A modem, the modem will not accept data from ISP 52 at V.90 rates but will perform a fall back to the V.34 data transmission protocol and limit data transmission rate from ISP 52 to a maximum transmission rate of 33.6 KBps. This maximum transmission rate is substantially lower than the maximum receive transmission rate of the V.90A modem.

Figure 2:
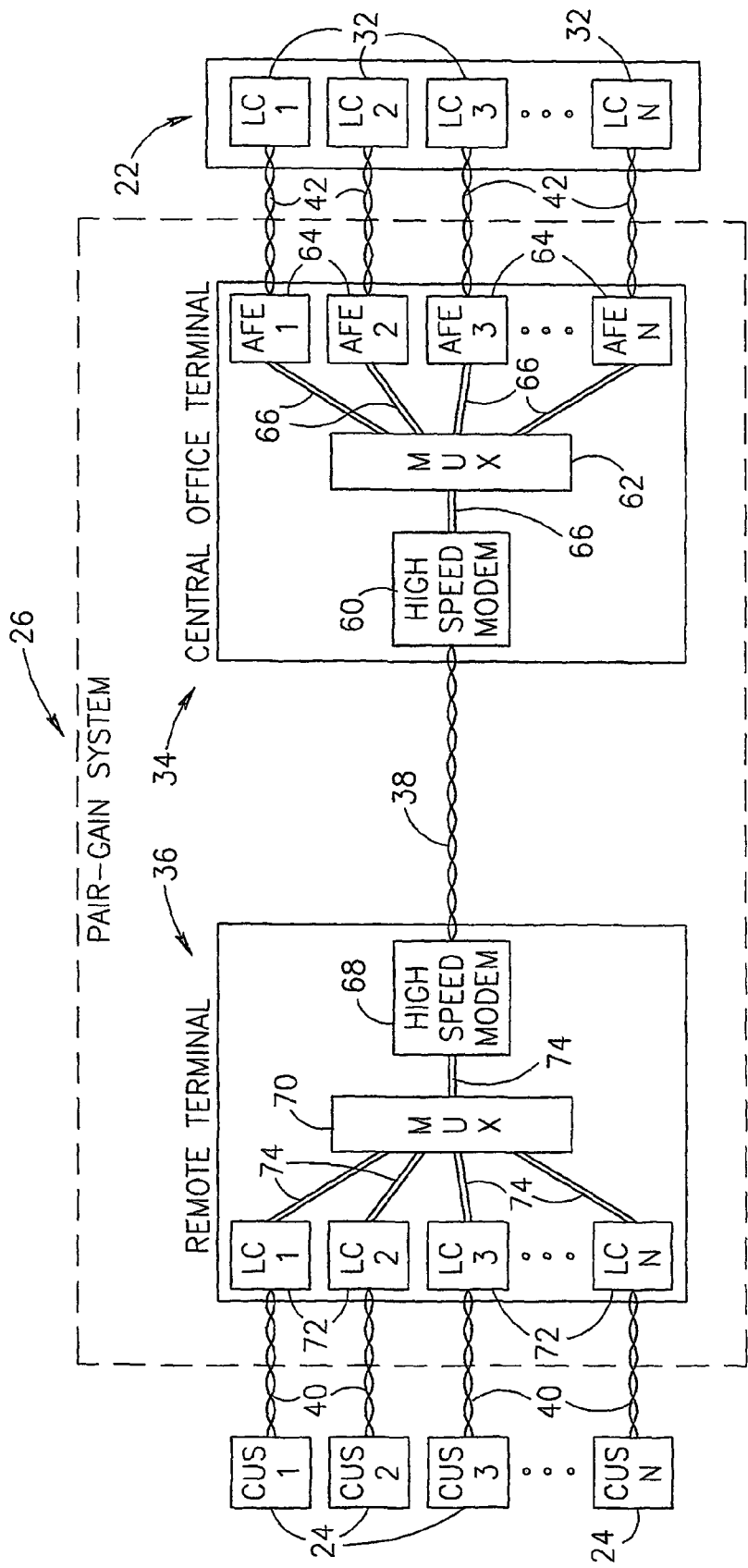
FIG. 2 schematically shows details of the pair-gain system shown in FIG. 1.

FIG. 2 schematically shows details of pair-gain system 26 shown in FIG. 1. Central office terminal 34 of pair-gain system 26 typically comprises a high-speed modem 60, a multiplexer 62 and a conventional analogue front end 64 for each line card 32 of central office 22 connected to pair-gain system 26. The conventional analogue front end 64 and its corresponding line card 32 are connected via the twisted pair 42, from the line card to the pair-gain system. Digital trunks 66 connect conventional analogue front ends 64 to multiplexer 62 and multiplexer 62 to high-speed modem 60.

Conventional analogue front ends 64 convert downstream signals that they receive from their corresponding line cards 32 to digital signals and transmit the digital signals in DS0 data streams to multiplexer 62. Multiplexer 62 multiplexes the DS0 streams to generate a digital data stream, which is input to high-speed modem 60. High-speed modem 60 converts the digital data stream to suitable analogue signals that it transmits to remote terminal 36 via twisted pair 38.

Remote terminal 36 comprises a high-speed modem 68, a multiplexer 70 and a line card 72 connected to each twisted pair 40 from a customer 24 serviced by pair-gain system 26. High-speed modem 68 is connected to multiplexer 70 and multiplexer 70 in turn is connected to line cards 72 via digital trunks 74.

High-speed modem 68 receives the analogue signals transmitted by high-speed modem 60 and converts the signals to a digital data stream, which it transmits to a multiplexer 70. Multiplexer 70 demultiplexes the data stream and routs the demultiplexed digital signals to appropriate line cards 72, which convert the digital signals to analogue signals that are transmitted to their intended customers via twisted pairs 40.

The analogue to digital conversion performed by conventional analogue front ends 64 is performed generally using either A-law or µ-law companding (according to ITU G.711) with 8 bit resolution and a sampling rate of 8000 samples per second. Following the analogue to digital conversion, the data signals cannot generally be decoded by a V.90A modem according to the V.90 protocol due to the noise and signal degradation caused by the analogue to digital conversion.

Upstream signals from customers 24 to central office 22 are similarly multiplexed and demultiplexed in "reverse" direction by pair-gain system 26 at remote terminal 36 and central office terminal 34 respectively.

Figure 3:
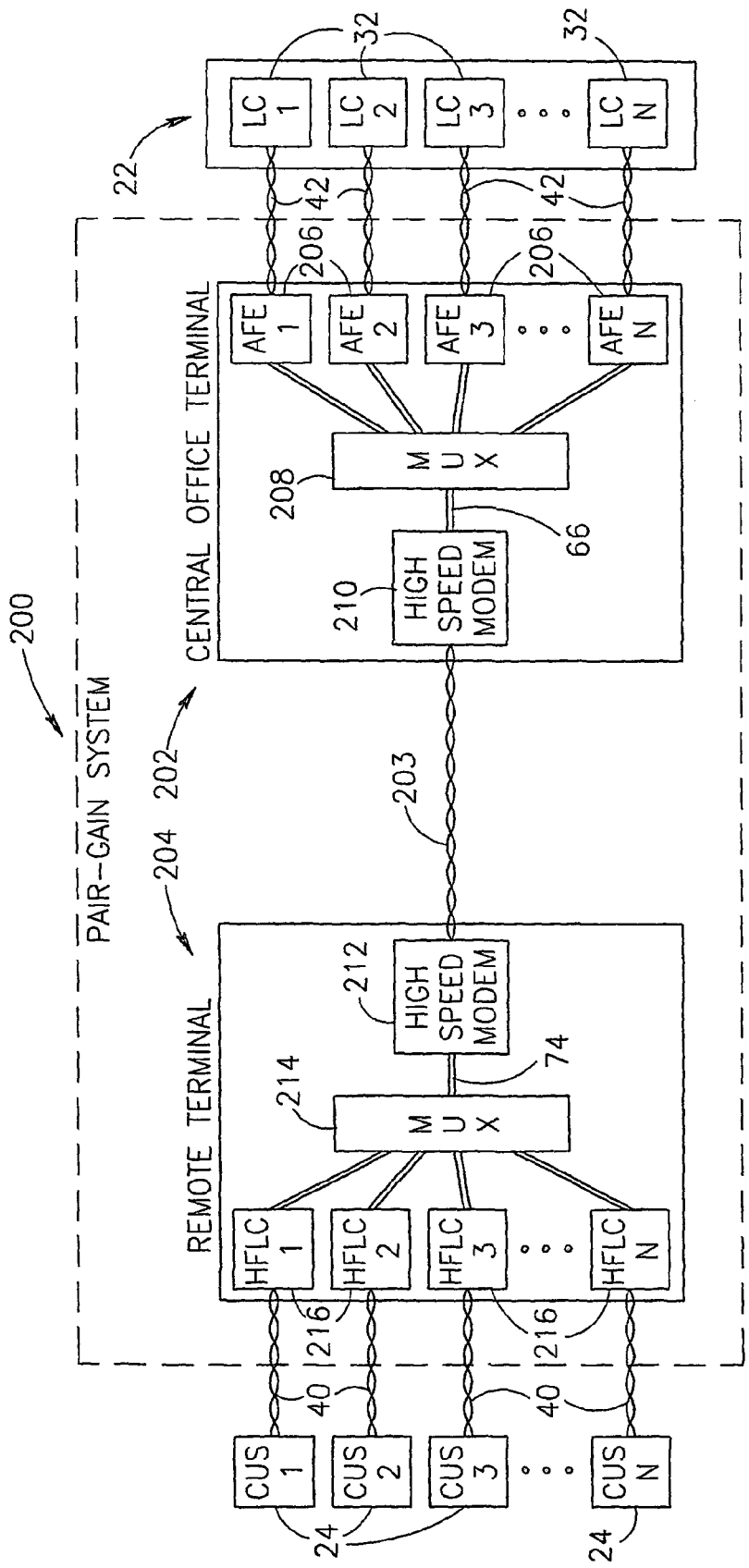
FIG. 3 schematically shows another pair-gain system, in accordance with an embodiment of the present invention.

FIG. 3 schematically shows a pair-gain system 200 that supports transmission of V.90 data at transmission rates up to 56 KBps, according to an embodiment of the present invention.

Pair-gain system 200 is similar in configuration to prior art pair-gain system 26, and comprises a central office terminal 202 connected to a remote terminal 204 by a twisted pair 203. Central office terminal 202 comprises a plurality of analogue front ends 206 connected to line cards 32 in central office 22 via twisted pairs 42, a multiplexer 208 and a high-speed modem 210. Remote terminal 204 similarly comprises a high-speed modem 212, multiplexer 214 and high fidelity line cards 216 that are connected to customers 24 via twisted pairs 40. Modems and multiplexers in remote terminal 204 may be identical to corresponding components in central office terminal 202.

Unlike conventional analogue front ends 64 in pair-gain system 26, analogue front ends 206 and line cards 216 are linear and have a resolution of at least 15 bits. Analogue front ends 206 and line cards 216 sample analogue signals that they receive at sampling rates equal to or greater than 8,000 samples per second. In some embodiments of the present invention, the sampling rates are greater than or equal to 9,600 samples per second. In some embodiments of the present invention, the sampling rates are greater than or equal to 16,000 samples per second.

Bit streams generated by analogue front ends 206 and line cards 216 from analogue signals that they receive are high fidelity bits streams that have substantially less quantization noise than bit streams generated by conventional analogue front ends 64 of pair-gain system 26 from analogue signals that they receive.

Multiplexers 208 and 214 are matched to analogue front ends 206 and line cards 216 so that they are capable of receiving and multiplexing bit streams from the analogue front ends at transmission rates at which the analogue front ends generate bits from signals that they digitize. Bit streams transmitted by analogue front ends 206 and line cards 216 to multiplexers 208 and 214 respectively do not have to be resampled prior to transmission to the multiplexers.

Figure 4:
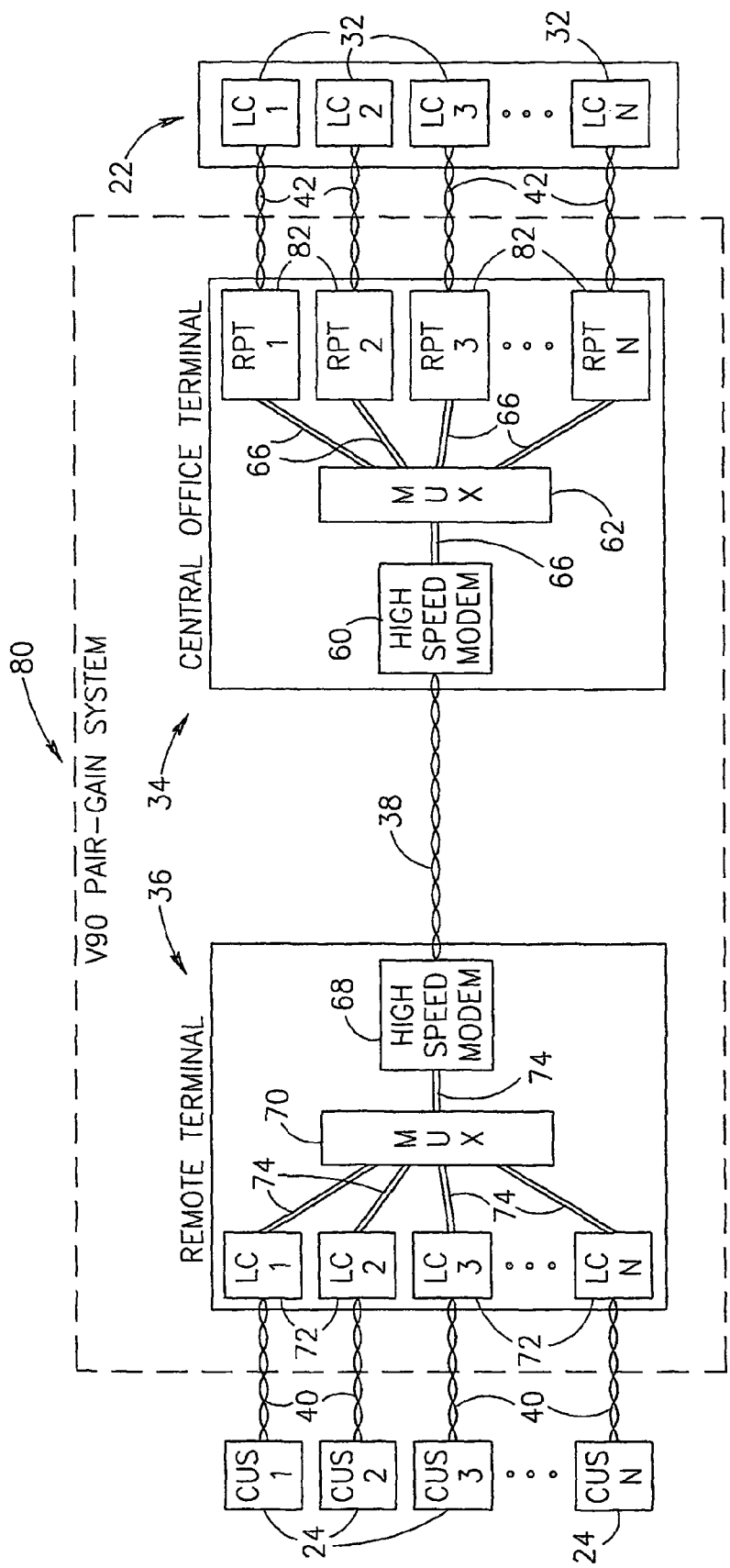
FIG. 4 schematically shows a pair-gain system, in accordance with an embodiment of the present invention.

As a result of the high fidelity analogue to digital conversion provided by pair-gain system 200, in accordance with an embodiment of the present invention, pair-gain system 200 supports data transmission rates of up to 56 KBps for V.90 data FIG. 4 schematically shows a "V.90" pair-gain system 80, in accordance with an embodiment of the present invention that can support data transmission to a V.90A modem at transmission rates up to 56 KBps.

Pair-gain system 80 is identical to pair-gain system 26 shown in FIG. 2 except that in pair-gain system 80 repeaters 82 replace conventional analogue front ends 64 of pair-gain system 26. None of the other components of either central office terminal 34 or remote terminal 36 of pair-gain system 26 are altered or replaced in upgrading pair-gain system 26 to pair-gain system 80 so that it can transmit V.90 data to a customer at up to 56 KBps. A prior art pair-gain system can therefore be upgraded to a pair-gain system that supports V.90 data transmission, in accordance with some embodiments of the present invention, relatively easily and inexpensively.

In some embodiments of the present invention repeaters 82 are designed to determine whether a call routed to or from a customer 24 by central office 22 is a voice call, or a V.90 call. If a repeater 82 determines that a call between central office 22 and a customer 24 serviced by the repeater is a voice call, the repeater performs similarly to conventional analogue front ends 64 of pair-gain system 26. In instances for which the call is a voice call, the repeater 84 codes and decodes signals using a companding algorithm, 8 bit resolution and a sampling rate of 8000 samples per second.

If however, the customer is connected to pair-gain system 80 via a V.90A modem (not shown) and repeater 82 determines that the call is a V.90 call, the repeater digitizes downstream signals from central office 22 to generate a DS0 data stream of PCM octets encoded according to the V.90 protocol. As a result the data stream can be decoded by the customer's V.90A modem at data transmission rates up to 56 KBps. Upstream data is transmitted by the customer's V.90A modem to and decoded by repeater 82 at up to 33.6 KBps.

Figure 5:
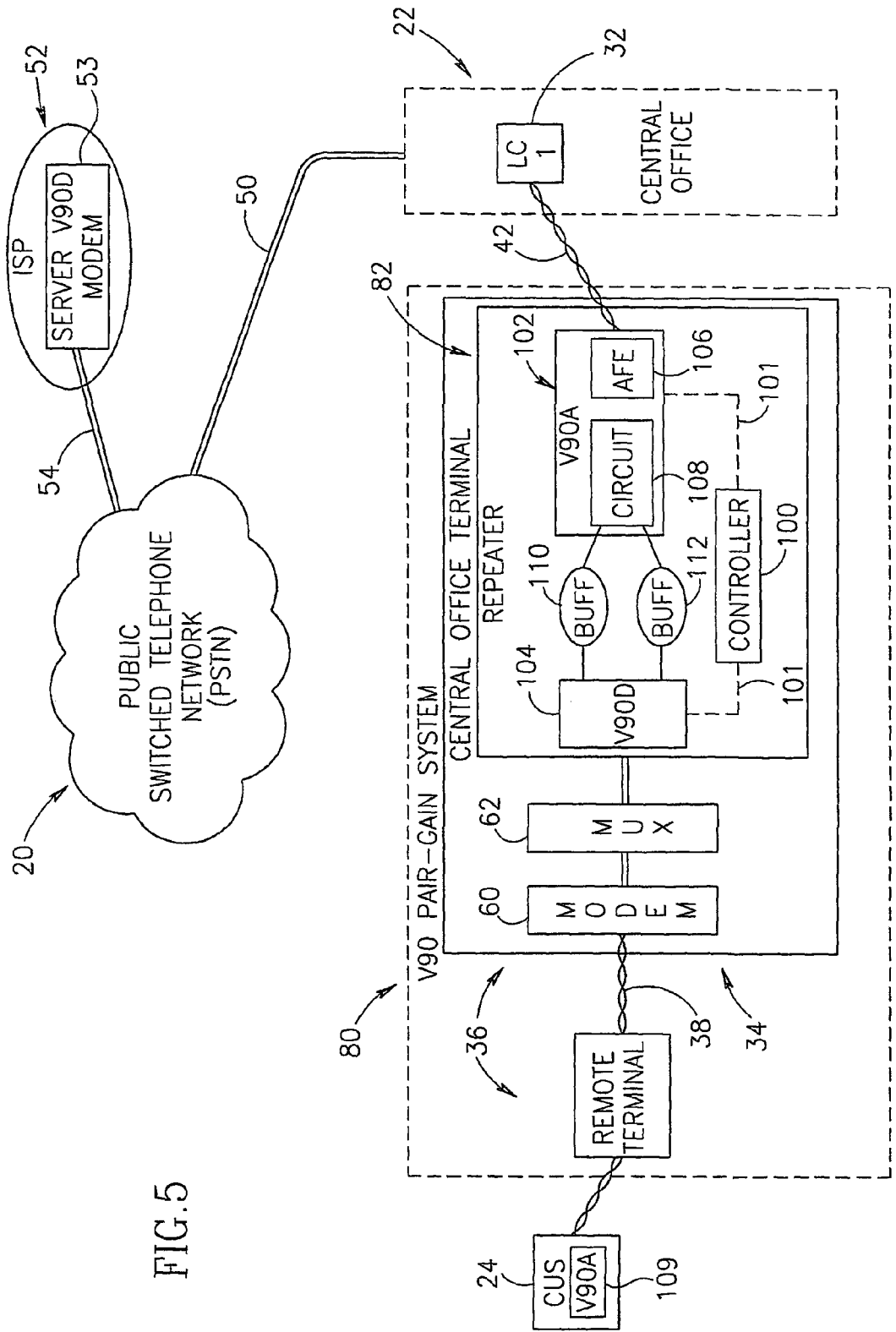
FIG. 5 schematically shows details of the pair-gain system shown in FIG. 3.

FIG. 5 schematically shows V.90 pair-gain system 80 and details of one repeater 82 comprised in its central office terminal 34, in accordance with an embodiment of the present invention. Features not germane to the discussion of the repeater 82 and its operation are not shown in FIG. 5. Repeater 82 receives analogue signals from a line card 32 that services a customer 24 via the line card's twisted pair 42.

In some embodiments of the present invention repeater 82 comprises a controller 100, a V.90A modem 102 and a V.90D modem 104. Controller 100 is connected via control and data lines 101 to V.90A modem 102 and V.90D modem 104. V.90A modem 102 comprises a "V.90" analogue front end 106 and modem processing circuitry 108. V.90 analogue front end 106 is connected to twisted pair 42. V.90D modem 104 is connected to multiplexer 62 and therethrough via high-speed modem 60 and twisted pair 38 to remote terminal 36 and to customer 24. It is assumed that customer 24 is connected to V.90 pair-gain system 80 by a V.90A modem 109.

When repeater 82 is operating in V.90 call mode, analogue data signals received by V.90A modem 102 for customer 24 from central office 22 are digitized by V.90 analogue front end 106 and demodulated into a bit stream by modem circuitry 108 which is transmitted to V.90D modem 104. V.90D modem 104 processes the bits it receives and converts them into PCM octets according to the V.90 protocol and transmits the octets in a DS0 data stream to multiplexer 62. Multiplexer 62 multiplexes the DS0 stream with DS0 data streams from other repeaters and/or conventional analogue front ends 64 (FIG. 1) and transmits the multiplexed data streams to remote terminal 36.

In some embodiments of the present invention, data bits transmitted downstream to V.90D modem are buffered by a "downstream" buffer 110. V.90A modem 102 "writes" data bits that it generates on downstream cyclic buffer 110 and V.90D modem 104 "reads" the bits from the buffer. Buffer 110 cushions temporary differences between a rate at which V.90A modem 102 transmits data bits to modem V.90D and a rate at which V.90D modem is able to receive the data bits. Optionally buffer 110 is a cyclic buffer.

PCM upstream data from V.90A modem 109 of customer 24 to central office 22, which V.90D modem 104 receives via multiplexer 62, is processed into a bit stream by V.90D modem 104 and transmitted to V.90A modem 102. V.90A modem parses the bits that it receives into PCM octets according to the V.90 protocol and transmits the octets as a V.90 PCM data stream to line card 32. In some embodiments of the present invention, data bits transmitted upstream by V.90D modem 104 to V.90A modem 106 are buffered by an "upstream" buffer 112. Optionally, buffer 112 is a cyclic buffer. Preferably, bit stream transmission between V.90A and V.90D modems 102 and 104 is performed without ECDC layer termination.

In some embodiments of the present invention V.90 analogue front end 106 has a resolution greater than or equal to 15 bits and converts analogue signals that it receives from line card 32 to digital signals at a sampling rate equal to or greater than 8,000 samples per second. In some embodiments of the present invention, the sampling rate is greater than or equal to 9,600 samples per second. In some embodiments of the present invention, the sampling rate is greater than or equal to 16,000 samples per second. In embodiments of the present invention for which V.90 analogue front end 106 operates at a sampling rate of 8000 samples per second, in order for V.90 analogue front end 106 to generate an accurate digital data stream from analogue input signals, sampling times at which signals from line card 32 are sampled are synchronized, using methods known in the art, with times at which the signals are transmitted.

As a result of the enhanced resolution and sampling quantization error of the digital output signals from V.90 analogue front end 106 is substantially smaller than the quantization error in output signals of conventional analogue front end 64. Therefore, when central office 22 receives V.90 data addressed to customer 24 a DS0 data stream generated by V.90D modem 104 responsive thereto reproduces the V.90 data accurately and the data can be transmitted to V.90A modem 109 of customer 24 at transmission rates up to 56 KBps. As a result of the operation of repeater 82 in V.90 call mode, in accordance with an embodiment of the present invention, pair-gain system 80 supports transmission of V.90 data to customer 24 at transmission rates up to 56 KBps.

When repeater 82 is operating in voice call mode, digital output signals of V.90 analogue front end 106 generated responsive to analogue signals received from line card 32 are not processed into a bit stream by modem circuitry 108. Instead the signals are resampled by a resampling circuit (not shown) comprised in repeater 82 to provide a DS0 data stream that is transmitted directly to multiplexer 62. Upstream voice call data from customer 24 is similarly shunted around V.90D modem and V.90A modem circuitry 108 and routed by multiplexer to V.90 analogue front end 106. V.90 analogue front end 106 processes the voice call data to generate suitable analogue signals for transmission to line card 32.

Controller 100 operates to determine whether repeater 80 operates in voice call mode or V.90 call mode. Functions performed by controller 100 may be executed by hardware or software or a combination of hardware and software comprised in the controller or accessed by the controller. Repeater 82 is normally in voice call mode. When a call between customer 24 and another customer of PSTN 20 is initiated, the controller "eavesdrops" on transmission between customer 24 and the other customer to determine if the call is a voice call or a V.90 call. If the call is a voice call, controller 100 leaves repeater 82 in the voice call mode. If the call is a V.90 call, controller 100 switches repeater 82 to the V.90 mode.

In some embodiments of the present invention, repeater 82 does not replace conventional analogue front end 64 in pair gain system 26 (FIG. 2) but instead is installed in parallel with it. In cases for which controller 100 determines that a voice call is being established with customer 24, the controller "disengages" repeater 82 and routes signals from and to the customer's line card 32 via analogue front end 64.

In some embodiments of the present invention, controller 100 determines whether the call is a V.90 call by determining if transmission between customer 24 and the other PSTN customer at call startup is characteristic of a handshake session (i.e. a V.8 session) between two modems and if during the handshake, the modems are attempting to set up a V.90 call. If the handshake is a "V.90 handshake" between a V.90D modem, for example server V.90D modem 53 of ISP 52, and V.90A modem 109 of customer 24, controller 100 switches repeater 82 to the V.90 call mode preferably within 70 milliseconds following the end of the handshake. If the switch is not accomplished within 70 milliseconds, the V.90 modems (server V.90D modem 53 and customer modem 109) will determine, as a result of repeater 82 being in voice call mode, that V.90 transmission cannot be supported by the communication channel that links them. If this occurs, the modems will determine to communicate using a V.34 data transmission protocol, which is a fall back protocol that V.90 modems use when a V.90 call between them cannot be supported.

When controller 100 switches repeater 82 to V.90 mode, as noted above, V.90A modem 109 of customer 24 is connected (through multiplexer 62) to V.90D modem of repeater 82 and V.90A modem 102 of repeater 82 is connected (through central office 22) to a V.90D modem 53 of ISP 52. Let the connection between V.90D modem 104 of repeater 82 and V.90A modem of customer 24 be referred to as a "customer loop". Let the connection between V.90A modem 102 and V.90D modem of ISP 52 be referred to as a "server loop".

After switching to V.90 mode, modems 104 and 109 in the customer loop begin negotiating data transmission rates that they will use for transmitting data between them. Similarly modems 102 and 53 in the server loop begin negotiating data transmission rates. In order to provide efficient data transfer between customer 24 and ISP 52, upstream and downstream data transmission rates on the customer loop are preferably equal respectively to upstream and downstream data transmission on the server loop. This enables repeater 64 to operate without ECDC termination at repeater modems 102 and 104, which substantially reduces delay in data transmission between customer V.90A modem 109 and server V.90D modem 53. In addition, following negotiation of the respective data transmission rates, in order for the ECDC layer deployed by server V.90D modem 53 and customer V.90A modem 109 to couple successfully, data transmission on the customer loop preferably begins substantially simultaneously with data transmission on the server loop.

In some embodiments of the present invention controller 100 controls V.90A and V.90D modems 102 and 104 in repeater 82 so that upstream and downstream data transmission rates negotiated for the customer loop are the same respectively as upstream and downstream data transmission rates negotiated for the server loop. After data transmission rates are negotiated, controller 100 controls modems 102 and 104 so that data transmission begins simultaneously on the customer loop and the server loop.

Figure 6A:
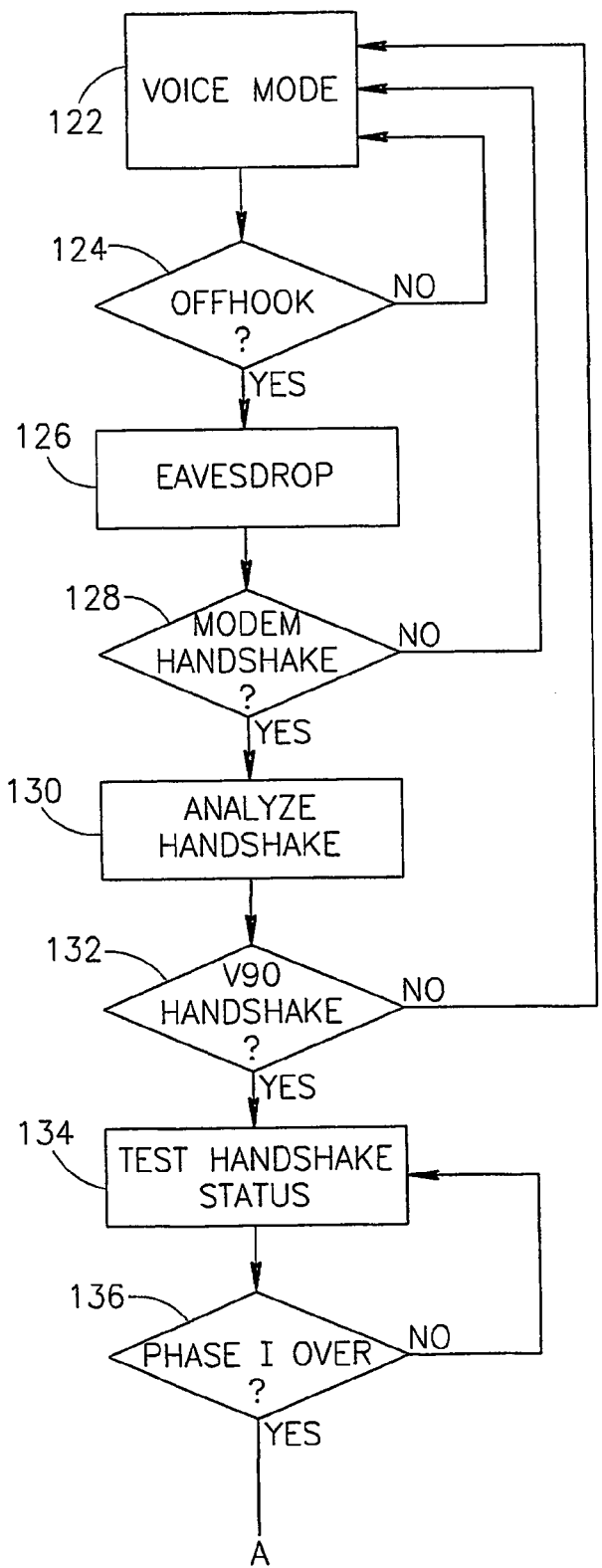
FIGS. 6A–6C show a flow chart illustrating operation of the pair-gain system shown in FIGS. 3 and 4, in accordance with an embodiment of the present invention.
Figure 6B:
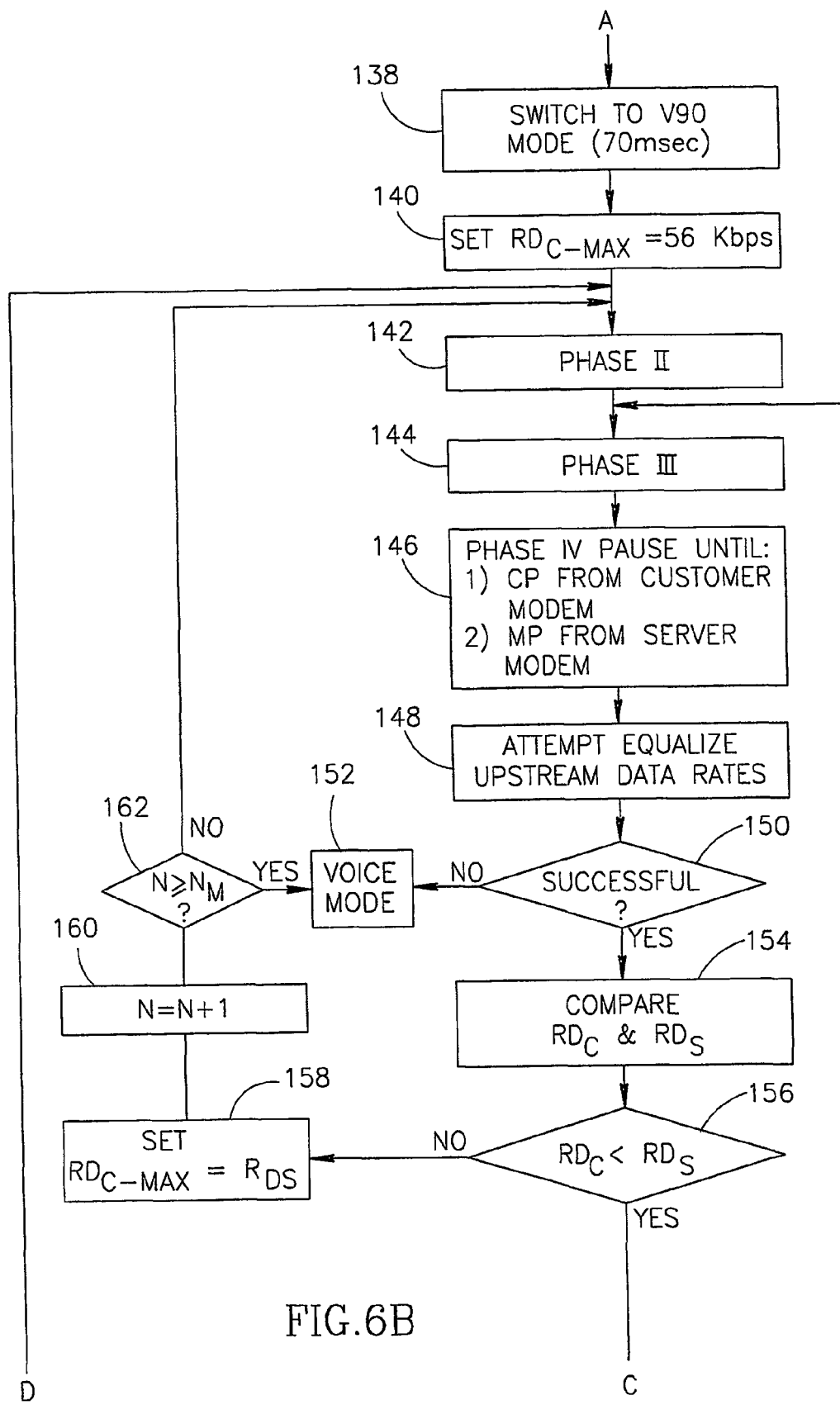
Figure 6C:
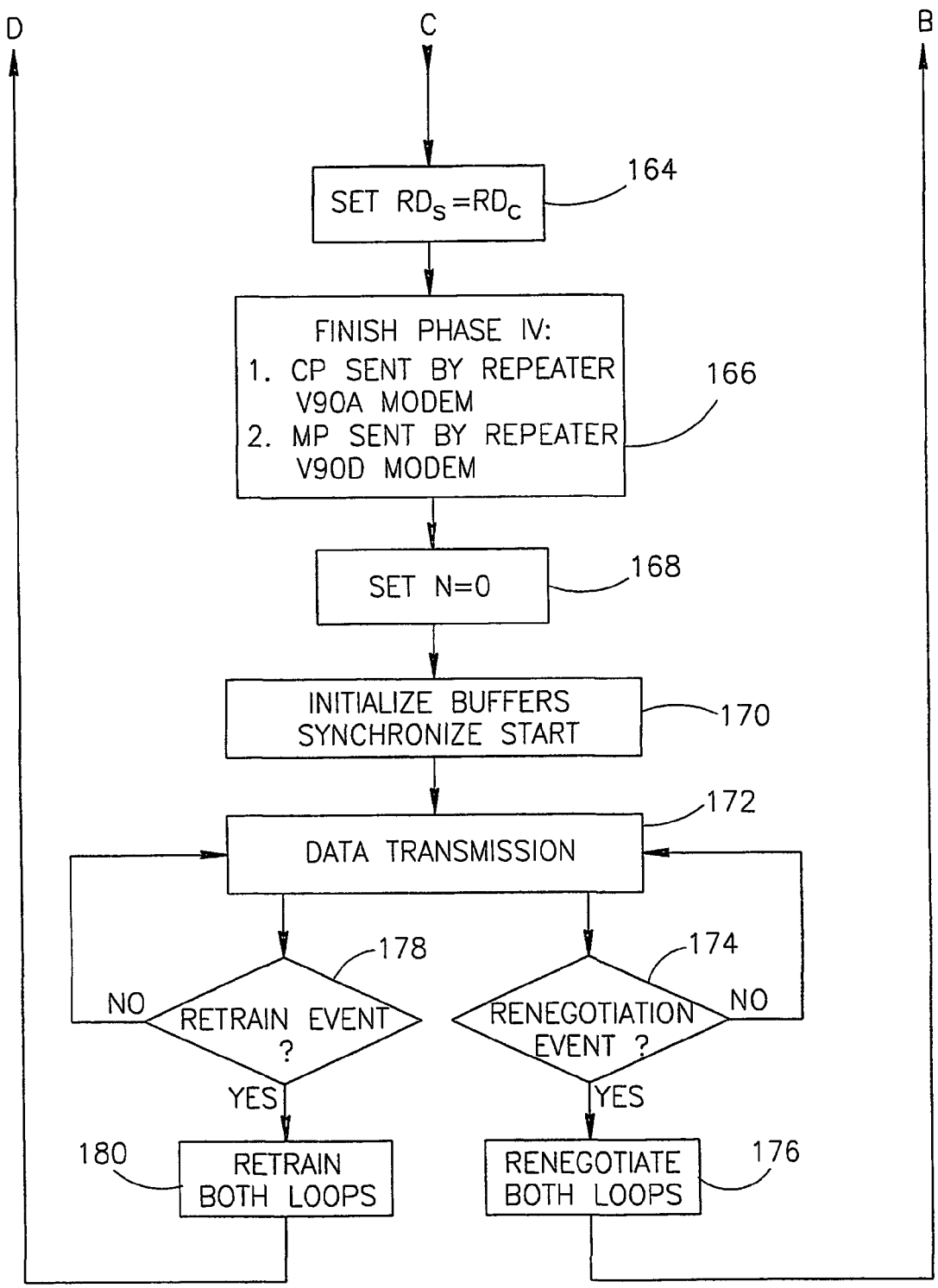

FIGS. 6A–6C show a flow chart illustrating a procedure 120, in accordance with an embodiment of the present invention, by which controller 100 determines that a V.90 call is being initiated between customer 24 and ISP 52 and switches repeater 82 to V.90 call mode.

In procedure 120, controller 100 operates to set upstream and downstream data transmission rates in the customer loop equal respectively to upstream and downstream data transmission rates in the server loop, in accordance with an embodiment of the present invention. Procedure 120 does not include all acts involved in setting up a V.90 call between customer 24 and ISP 52, many of which are standard handshake steps defined by a V.90 training sequence. Procedure 120 shows only acts required to understand operation of repeater 82 and controller 100 in setting up the V.90 call. Acts that relate to determining upstream transmission rates, which are shown occurring before determination of downstream rates are, in practice, generally temporally interleaved with acts executed in determining downstream data transmission rates. The acts are shown sequentially for convenience of presentation.

At block 122 of procedure 120, repeater 82 is in voice call mode and controller 100 (FIG. 5) is optionally idle and waiting for off-hook by customer 24 to indicate that a call is being setup between customer 24 and another customer of PSTN 20. In a decision block 124, if the controller senses off-hook, it proceeds to a step 126 and eavesdrops on communication between central office 22 and customer 24 (FIG. 5). If, in a following decision 128 controller 100 determines that the communication is characteristic of Phase I of a modem handshake, procedure 120 advances to 130. Otherwise controller 100 leaves repeater 82 in voice mode and procedure 120 returns to 122.

At 130 controller 100 analyzes Phase I of the modem handshake to determine if the modem handshake is a V.90 handshake. Controller 100 determines that the handshake is a V.90 handshake if customer V.90A modem 109 declares that it supports V.90 analogue transmission and server V.90D modem 53 declares that it supports V.90 digital transmission. If controller 100 determines that the handshake is not a V.90 handshake, in a decision 132 controller 100 leaves repeater 82 in voice mode and procedure 120 returns to 122. If controller 100 determines that the handshake is a V.90 handshake, it advances to 134 in which it tests the status of the handshake to determine when phase I is completed. In a decision 136, if controller 100 determines that Phase I has ended, the controller advances to 138 shown in FIG. 6B. In 138 controller 100 switches repeater 82 to V.90 mode within 70 milliseconds from a time at which it detects that the first phase is over.

Assuming that the other party connected to customer 24 is ISP 52, after switching repeater 82 to V.90 call mode, V.90A modem 102 of customer 24 is connected to server V.90D modem 53 via repeater 82. Upstream and downstream data transmission rates are then determined for the customer communication loop (V.90A modem 109 and V.90D modem 104) that are equal respectively to the upstream and downstream data transmission rates on the server communication loop (V.90A modem 102 and V.90D modem 53).

At block 140, controller 100 controls repeater V.90D modem 104 to set a maximum supported downstream transmission rate, "'$RD_{C\text{-}MAX}$'" on the customer loop equal to 56 $KB_{ps}$, which is the maximum rate of the V.90 protocol. At 142, modems on both communication loops then start Phase II of the V.90 handshake.

At 144 both modems in both loops perform Phase III of the V.90 handshake in which the digital modems announce transmission rates that they can support. At 146 modems in both loops enter Phase IV of the handshake. In Phase IV controller 100 pauses the handshake procedure until a "CP" sequence (defined in ITU-T V.90 9/98) is received from customer V.90A modem 109 and an "MP" sequence (ITU-T V.90 9/98) is received from server V.90D modem 53). The CP sequence defines a downstream data rate "$RD_C$" for the customer loop and comprises a transmit data signaling rate capability mask for the customer V.90A modem 109. The MP sequence defines a maximum data receive rate for server V.90D modem 53 and comprises a receive data signaling rate capability mask for server V.90D modem 53.

At 148 controller 100 attempts to equalize the upstream rates on both communication loops. To accomplish this, in some embodiments of the present invention, controller 100 determines a possible maximum upstream rate for the customer loop from the transmission mask received in the CP sequence from customer V.90A modem 109 and receive rates supported by repeater V.90D modem 104. Controller 100 compares the possible maximum customer loop upstream rate to the maximum server upstream rate received in the MP sequence from server V.90D modem 53. Controller 100 then controls repeater V.90D modem to set a maximum upstream rate for the customer loop equal to the minimum of the compared upstream rates.

Following setting of the maximum upstream rate on the customer loop, controller 100 sets the receive mask of repeater V.90D modem 104 equal to the receive mask of server V.90D modem 53. Repeater 100 also sets the transmission mask of repeater V.90A modem 102 equal to the transmission mask of customer V.90A modem 109. However, if the transmission mask supports upstream rates greater than the maximum customer loop upstream rate, the controller adjusts the transmission mask of repeater V.90A modem 102 so that the maximum upstream rate of the transmission mask is equal to the maximum upstream rate of the customer loop.

It is to be noted that controller 100 will, in general, be able to control the rate negotiations by controlling repeater modems 102 and 104 so that the upstream rates on the customer and server loops are the same. Equalization of the upstream rates is only impossible if a bit rate on one of the loops is equal or less than 2,600 bps and a symbol rate on the other loop is greater than or equal to 2,743 symbols per second.

In a decision 150, if controller 100 determines it cannot establish a same upstream data transmission rate for both loops, controller 100 branches to 152. In 154 procedure 120 abandons attempts to set up a V.90 call between customer 24 and ISP 52 and controller 100 terminates the V.90 handshake and switches repeater 82 to voice call mode. If on the other hand controller 100 is successful in establishing equal upstream rates for both loops, procedure 120 advances to a step 154. In 154, controller 100 compares downstream rate $RD_C$ negotiated on the customer loop by V.90A customer modem 109 and V.90D repeater modem 104 to a downstream rate $RD_S$ on the server loop negotiated by repeater V90A modem 102 and server V90D modem 53. In a decision step 156 if $RD_C \geq RD_S$ then procedure 120 branches to 158 at which controller 100 controls repeater modem V.90D to set $RD_{C\text{-}MAX}=RD_S$. Procedure 120 then proceeds to 160 at which it advances a cycle counter "N" by 1 and checks in decision 162 whether or not N is greater than or equal to a maximum cycle number $N_M$. (Cycle counter N was initialized to zero in a step 168 following completion of a preceding handshake, renegotiation or retraining.) If $N \geq N_M$, then procedure 120 branches to 152 and reverts to the call mode. If on the other hand $N<N_M$, procedure 120 returns to 142 and starts Phase II again with the newly determined $RD_{C\text{-}MAX}$.

If $RD_C \leq RD_S$, procedure 120 advances to 164, in which if $RD_C$ is less than $RD_S$, $RD_S$ is set equal to $RD_C$ and repeater modem V.90A 102 choose a "downstream" constellation that supports the downstream rate $RD_C$. At 166 both communication loops complete Phase IV of the handshake and V.90 analogue modem 102 transmit a CP sequence to server V.90D modem 53 and repeater V.90D modem 104 transmits an MP sequence to customer V.90A modem. In a step 168, controller 100 zeros the cycle counter N.

At 170 controller 100 initializes upstream and downstream buffers 110 and 112 and synchronizes the repeater modems so that they initiate data transmission at a same time. Data transmission between customer V.90A modem 102 and server modem V.90D takes place thereafter in accordance with the V.90 protocol in a step 172.

Initializing cyclic buffers 110 and 112 (FIG. 5) comprises, for example, writing a block of binary ones in each buffer so as to separate the read pointer from the write pointer. The block of binary ones will not generate transmission errors at onset of data transmission since binary ones at the beginning of data transmission is considered part of training by the V.90 protocol. Thereafter, inequalities in transmission rates between the customer loop and the server loop may be generated that cause the read pointer to reach the write pointer, or the write pointer to reach the read pointer from behind on a buffer 110 or 112. When this occurs on a buffer, controller 100 writes a block of binary ones to the buffer. The block of ones generates a transmission error that causes the ECDC protocol deployed by modems 109 and 53 to initiate retransmission of data in the buffer. Optionally, the buffer size is such that it can contain more than one modem frame of data and less than two modem frames of data. As a result, a temporary mismatch in transmission rates that results in a block of ones being written to a buffer during data transmission will cause retransmission of at most two data frames.

If during data transmission an event occurs that triggers rate renegotiation on one of the loops, in a decision 174 controller 100 advances to 176 in which it controls the repeater modems so that rate renegotiation begins on both loops and the controller returns to step 144. Similarly, if during data transmission an event occurs that triggers retraining on one of the loops, in a decision 178 controller 100 advances to 180 at which it controls the repeater modems so that retraining begins on both loops and the controller returns to 142.

It should be noted that whereas repeater 82 has been described for adapting a communication channel for data transmission according to the V.90 protocol repeaters similar in construction and concept can be constructed to adapt communication channels for transmission of data according to other protocols.

In the description and claims of the present application, each of the verbs, "comprise" "include" and "have", and conjugates thereof, are to be interpreted as "including but not necessarily limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A repeater having first and second communication terminals that receives signals at either of the terminals and transmits signals responsive to the received signals at the other of the terminals, comprising:
 a first signal processor that receives analogue data signals from the first terminal and generates bit streams responsive thereto that accurately reproduce the data in the analogue signals, by performing partial modem termination, including demodulation but not including ECDC (error correction data compression) layer termination;
 a second signal processor;
 a communication channel linking the first and second signal processors; and
 a controller that monitors signal traffic at the repeater terminals and controls the processors responsive to the signal traffic,
 wherein the second signal processor receives the bit streams generated by the first signal processor via the communication channel and transmits PCM octets responsive thereto via the second terminal.

2. A repeater according to claim 1, wherein the second signal processor receives V.90 PCM octets from the second terminal and generates bit streams responsive thereto that are transmitted to the first processor via the communication channel.

3. A repeater according to claim 2 wherein the first signal processor transmits analogue signals responsive to the bit streams that it receives from the second signal processor via the first terminal.

4. A repeater according to claim 3, wherein the first signal processor is a first repeater modem and the second signal processor is a second repeater modem.

5. A repeater according to claim 4, wherein when the first and second terminals are connected to third and fourth modems respectively so as to transmit data between the third and fourth modems, the repeater first and second modems negotiate data transfer rates respectively with the third and fourth modems respectively and the controller controls the repeater modems so as to establish a negotiated upstream data rate from the repeater first modem to the third modem that is equal to a negotiated upstream data rate from the fourth modem to the repeater second modem.

6. A repeater according to claim 5, wherein the controller controls the repeater modems so as to establish a negotiated downstream data rate from the connected third modem to the repeater first modem that is equal to a negotiated downstream data transfer rate from the repeater second modem to the fourth modem.

7. A repeater according to claim 6, and comprising an alternate communication link over which signals can be transmitted between the first and second terminals without being routed through the repeater modems.

8. A repeater according to claim 7, wherein the controller is adapted to route signals between the first and second terminals via the alternate communication link, if the controller cannot establish equal upstream and downstream data rates within a predetermined period of time.

9. A repeater according to claim 7, wherein the controller is adapted to route signals between the first and second terminals via the alternate communication link, if the controller determines from the data traffic that the repeater is connected to transmit signals other than V.90 data signals.

10. A repeater according to claim 7, wherein the alternate communication link comprises an analogue front end that receives analogue signals from the first terminal and generates a bit stream responsive thereto and wherein digital signals responsive to the bit stream are transmitted from the second terminal.

11. A repeater according to claim 10, wherein the alternate communication link comprises resampling circuitry that resamples analogue front end bit streams to provide a resampled bit stream that is transmitted from the second terminal.

12. A repeater according to claim 11, wherein the resampling circuitry resamples digital signals received at the second terminal into analogue front end bit streams that are transmitted to the analogue front end which generates analogue signals responsive thereto, which are transmitted from the first terminal.

13. A repeater according to claim 10, wherein the bit stream generated by the analogue front end is characterized by a bit rate greater than that of a DS0 data stream.

14. A repeater according to claim 13, wherein the alternate communication link comprises resampling circuitry adapted to resample the bit streams generated by the analogue front end into DS0 data streams and to resample DS0 data streams received from the second terminal into bit streams provided to the analogue front end.

15. A repeater according to claim 10, wherein the analogue front end is comprised in the first repeater modem.

16. A repeater according to claim 5, wherein the first modem is a V.90 analogue modem.

17. A repeater according to claim 16, wherein the second modem is a V.90 digital modem.

18. A repeater according to claim 17, wherein when the third modem is a V.90 digital modem connected to the first terminal via a line card and the fourth modem is a V.90 analogue modem connected to the second terminal via a line card, in order to establish equal downstream rates, during the negotiations the controller controls the repeater digital modem to pause negotiation of a downstream rate until a possible downstream rate is determined from the connected digital modem to the repeater analogue modem.

19. A repeater according to claim 18, wherein if a maximum negotiable downstream rate from the repeater digital modem to the connected analogue modem is less than or equal to the possible downstream rate for the connected digital modem to the repeater analogue modem, the controller waits until the connected analogue modem determines a downstream rate from the repeater digital modem and controls the repeater analogue modem to determine a downstream rate from the connected digital modem equal to the downstream rate determined by the connected analogue modem.

20. A repeater according to claim 19, wherein if the maximum negotiable downstream is greater than the possible downstream rate from the connected digital modem to the repeater analogue modem, the controller controls the repeater digital modem to set a maximum negotiable downstream rate equal to the possible downstream rate and begin negotiation of the downstream rates between the repeater modems and the connected modems again.

21. A repeater according to claim 20, wherein, in order to establish equal upstream rates, the controller determines a maximum possible upstream rate from the connected analogue modem to the repeater digital modem and receives, from the connected digital modem, a maximum upstream rate from the repeater analogue modem to the connected digital modem and wherein the controller controls the repeater digital modem to set a maximum upstream rate from the connected analogue modem to the repeater digital modem equal to the smallest of the determined maximum possible upstream rate and the maximum upstream rate received from the connected digital modem.

22. A repeater according to claim 21, wherein following setting of the maximum upstream rate from the connected analogue modem to the repeater digital modem the controller controls of the repeater analogue modem so as to set a maximum transmission rate by the repeater analogue modem equal to the upstream rate set for data transmission from the connected analogue modem to the repeater digital modem.

23. A repeater according to claim 2, wherein the communication channel comprises a first buffer and wherein the second signal processor writes the bit streams that it generates in the first buffer.

24. A repeater according to claim 23, wherein the first signal processor reads the bit stream from the first buffer.

25. A repeater according to claim 23, wherein the first buffer is a cyclic buffer.

26. A repeater according to claim 23, wherein the communication channel comprises a second buffer and wherein the first signal processor writes the bit streams that it generates in the second buffer.

27. A repeater according to claim 26, wherein the second signal processor reads the bit streams from the second buffer.

28. A repeater according to claim 26, wherein the second buffer is a cyclic buffer.

29. A repeater according to claim 1, wherein the first terminal receives data signals which carry data at a rate up to 56 kbps.

30. A pair gain system comprising a central office terminal that receives analogue signals from a central office of a PSTN for a plurality of customers of the PSTN, multiplexes the signals and transmits them to a remote terminal where the signals are demultiplexed and transmitted to the customers for whom they were intended, wherein the central office terminal comprises:

a repeater for each customer that receives analogue signals from the central office for the customer at the first terminal and generates a digital data stream responsive thereto that it transmits from the second terminal;

a multiplexer that receives data streams generated by each of the repeaters and multiplexes the received signals; and a modem that receives the multiplexed signals and transmits them to the remote terminal, wherein the repeaters comprise:

a first signal processor that receives analogue data signals from the first terminal and generates bit streams responsive thereto that accurately reproduce the data in the analogue signals, by performing partial modem termination, including demodulation but not including ECDC (error correction data compression) layer termination;

a second signal processor; and a communication channel linking the first and second signal processors, wherein the second signal processor receives the bit streams generated by the first signal processor via the communication channel and transmits PCM octets responsive thereto via the second terminal.

31. A pair gain system according to claim 30, wherein the remote terminal comprises:

a modem that receives multiplexed signals from the central office terminal modem;

a multiplexer that receives the multiplexed signals from the remote terminal modem; and a line card for each of the plurality of customers, wherein the multiplexer demultiplexes the signals received from the remote terminal modem and routes the demultiplexed signals to the respective line cards of the customers for whom the demultiplexed signals are intended and wherein the line cards code and encode data according to a µ-law or an A-law companding algorithm at a sampling rate of 8000 samples per second and a resolution of 8 bits.

* * * * *